United States Patent [19]

Tsujimoto

[11] Patent Number: 4,935,644
[45] Date of Patent: Jun. 19, 1990

[54] CHARGE PUMP CIRCUIT HAVING A BOOSTED OUTPUT SIGNAL

[75] Inventor: Jun-ichi Tsujimoto, Yokohama, Japan

[73] Assignee: Kabushiki Kaisha Toshiba, Kawasaki, Japan

[21] Appl. No.: 228,156

[22] Filed: Aug. 4, 1988

[30] Foreign Application Priority Data

Aug. 13, 1987 [JP] Japan .................................. 62-202387

[51] Int. Cl.[5] ...................... H03K 3/354; H01L 19/00; H01L 27/04; H01L 29/94
[52] U.S. Cl. ............................... 307/296.2; 307/296.1; 307/304
[58] Field of Search ............... 307/296.1, 296.2, 296.6, 307/304

[56] References Cited

U.S. PATENT DOCUMENTS

| | | | |
|---|---|---|---|
| 4,214,174 | 7/1980 | Dickson | 328/160 |
| 4,388,537 | 6/1983 | Kanuma | 307/296.2 |
| 4,621,315 | 11/1986 | Vaughn et al. | 363/60 |
| 4,701,637 | 10/1987 | Piro | 307/296.2 |
| 4,733,108 | 3/1988 | Truong | 307/296.2 |
| 4,739,191 | 4/1988 | Puar | 307/296.2 |

FOREIGN PATENT DOCUMENTS 0113822 9/1979 Japan .................................. 307/296.2

OTHER PUBLICATIONS

"Charge Pump Circuit For a CMOS Substrate Generator", IBM Tech. Discl. Bull., vol. 29, No. 1, pp. 187-188, Jun. 1986.

J. McCreary et al., "Techniques for a 5-V-Only 64K EPROM Based Upon Substrate Hot-Electron Injection," IEEE Journal of Solid-State Circuits, vol. sc-19, No. 1, pp. 135-143.

J. Drori et al., "A Single 5V Supply Nonvolatile Static RAM," 1981, IEEE International Solid-State Circuits Conference Digest of Technical Papers, pp. 148-149.

Primary Examiner—Stanley D. Miller
Assistant Examiner—David R. Bertelson
Attorney, Agent, or Firm—Finnegan, Henderson, Farabow, Garrett, and Dunner

[57] ABSTRACT

A semiconductor integrated circuit device is provided which comprises a first charge pumping circuit comprising a plurality of MOS transistors cascade-connected between an input voltage node and a booster output node, where, of all associated nodes, those odd-numbered nodes receive one of first and second clock signals through a corresponding capacitor and those even-numbered nodes receive the other clock signal through a corresponding capacitor, a second charge pumping circuit comprising a plurality of MOS transistors cascade-connected between the input voltage node and the booster output node and equal in number to those of the first charge pumping circuit where, of all associated nodes, those odd-numbered nodes receive one of first and second clock signals through a corresponding capacitor and those even-numbered nodes receive the other clock signal through a corresponding capacitor and the gates of the respective MOS transistors are connected to the gate of the corresponding MOS transistors, and a high resistive element connected to an output terminal of said first charge pumping circuit.

5 Claims, 2 Drawing Sheets

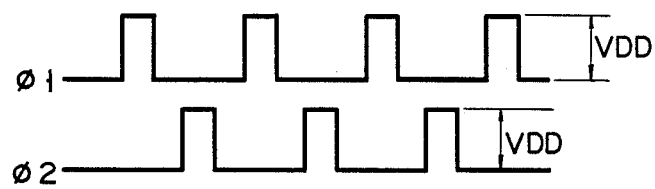
F I G. 2
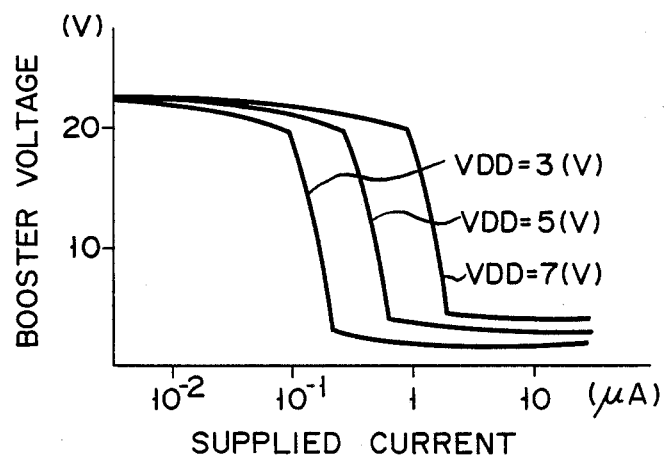
F I G. 3

CHARGE PUMP CIRCUIT HAVING A BOOSTED OUTPUT SIGNAL

BACKGROUND OF THE INVENTION

1. Field of the Invention

The present invention relates to a semiconductor IC (integrated circuit) device including an internal booster circuit for internally boosting up a power source voltage as supplied from an outer voltage source.

2. Description of the Related Art

An electrically erasable, programmable read only memory (EEPROM) requires a high voltage of, for example, about 20 V for data alteration and erasure of memory cells. A recent EEPROM is designed to internally boost up a power source voltage (usually 5 V) coming from an outer source, not to directly use an external high voltage. Since the user need not prepare any high voltage source, the EEPROM becomes more user-friendly.

FIG. 1 shows a conventional charge pumping circuit which is employed as an internal booster circuit for EEPROM. Between input voltage node IN and booster output node OUT a plurality of N channel enhancement type MOS (insulated gate type) transistors T1 to Tn are cascade-circuited each having its gate connected directly to its drain. A clock signal $\phi 1$ of a first phase is supplied via capacitor C1 to the node of each of the odd-numbered transistors T1 to Tn, while a clock signal $\phi 2$ of a second phase is supplied via capacitor C2 to the node of each of the even-numbered transistors. Respective capacitors C1 and C2 have a common capacitive values. As will be appreciated from FIG. 2, the clock signals $\phi 1$ and $\phi 2$ are not synchronized with each other and their amplitude level is equal to that of power source voltage $V_{DD}$, noting that the power source voltage $V_{DD}$ is applied to input voltage node IN.

In the internal booster circuit shown in FIG. 1, with the clock signal $\phi 1$ at a high level, a voltage on node Ni is boosted up to the power source voltage $V_{DD}$ level when the clock signal $\phi 1$ is supplied via capacitor C1 to that node. Transistor Ti whose gate is connected to node IN is turned ON and a voltage on a subsequent stage node Ni+1 is boosted up by a level:

$$V_{DD} - V_{TH} - Q/C$$

where:

$V_{TH}$: the gate threshold voltage of transistor Ti,
Q: the amount of charge transferred from node Ni to node Ni+1, and
C: the capacitive value of capacitors C1, C2.

With the clock signal $\phi 1$ at a low level, transistor Ti is turned OFF. When the clock signal $\phi 2$ goes high, a voltage on a subsequent stage node Ni+1 is boosted up by a level $V_{DD}$. That is, upon receipt of the clock signals $\phi 1$, $\phi 2$, the booster circuit boosts up a voltage at a rate of $$V_{DD} - V_{TH} - Q/C$$

per pair of nodes. Through the repetitive charge pumping operation, a predetermined boost-up voltage output emerges on a final booster output node OUT. Since, in practice, the gate threshold voltage Vth of transistor Ti is increased by a back bias effect in the boost-up process, the booster circuit fails to boost up the voltage at a rate of $V_{DD} - V_{TH} - Q/C = 0$. FIG. 3 shows a relation between a current output supplied and a boost-up output of the charge pumping circuit. As shown in FIG. 3, a current output supplied becomes very small when the power source voltage $V_{DD}$ is small.

There is an increasing tendency that EEPROMs will be incorporated into a portable electronic apparatus. A battery power source of about 3 V is usually employed in that application. For a voltage level lower than about 3 V (battery power source), however, the conventional internal booster circuit fails to exhibit an adequate current supply capacity.

SUMMARY OF THE INVENTION

It is accordingly an object of the present invention to provide a semiconductor IC circuit equipped with an internal booster circuit which, upon driving EEPROM's with a low voltage source, such as a battery, can assure a high current supply capacity which has otherwise not been obtained in a conventional booster circuit.

According to the present invention, a semiconductor integrated circuit device is provided which comprises a first charge pumping circuit comprising a plurality of MOS transistors cascade-connected between an input voltage node and a booster output node with the gate of the MOS transistor connected to the drain thereof, where, of all associated nodes, those odd-numbered nodes receive one of first and second clock signals of a different phase through a corresponding capacitor and those even-numbered nodes receive the other clock signal through a corresponding capacitor; a second charge pumping circuit comprising a plurality of MOS transistors cascade-connected between the input voltage node and the booster output node and equal in number to those of the first charge pumping circuit where, of all associated nodes, those odd-numbered nodes receive one of first and second clock signals of a different phase through a corresponding capacitor and those even-numbered nodes receive the other clock signal through a corresponding capacitor and the gate of the respective MOS transistors is connected to the gate of the corresponding MOS transistors; and a high resistive element connected to an output terminal of said first charge pumping circuit.

Since, according to the present invention, the first charge pumping circuit is connected at its output terminal to the high resistive element and hence there is almost no external current loss, it is possible to obtain a considerably high boost-up voltage even if a low-voltage source is employed. Furthermore, the respective stage transistor of the second charge circuit is driven by a voltage on a corresponding stage node of the first charge pumping circuit and hence a high current supply capacity can be obtained from an output terminal of the second charge pumping circuit.

BRIEF DESCRIPTION OF THE DRAWINGS

FIG. 2 is a waveform diagram showing clock signals of a different phase to be applied to the internal booster circuit;

FIG. 3 shows a relation between a boost-up voltage and an external supply current in the internal booster circuit.

DETAILED DESCRIPTION OF THE PREFERRED EMBODIMENTS

The embodiment of the present invention will be explained below in more detail with reference to the accompanying drawings.

Figure 1:
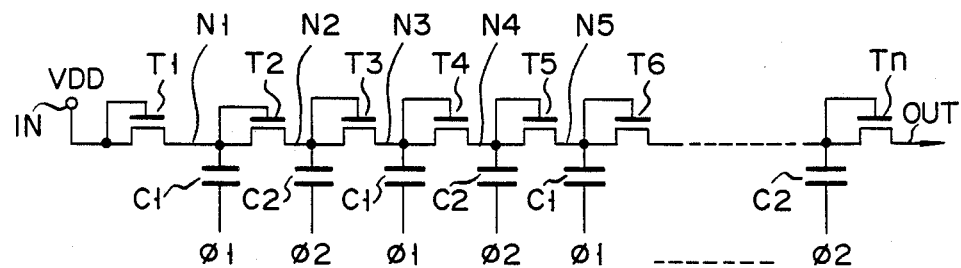
FIG. 1 is a circuit showing a conventional booster circuit.
Figure 4:
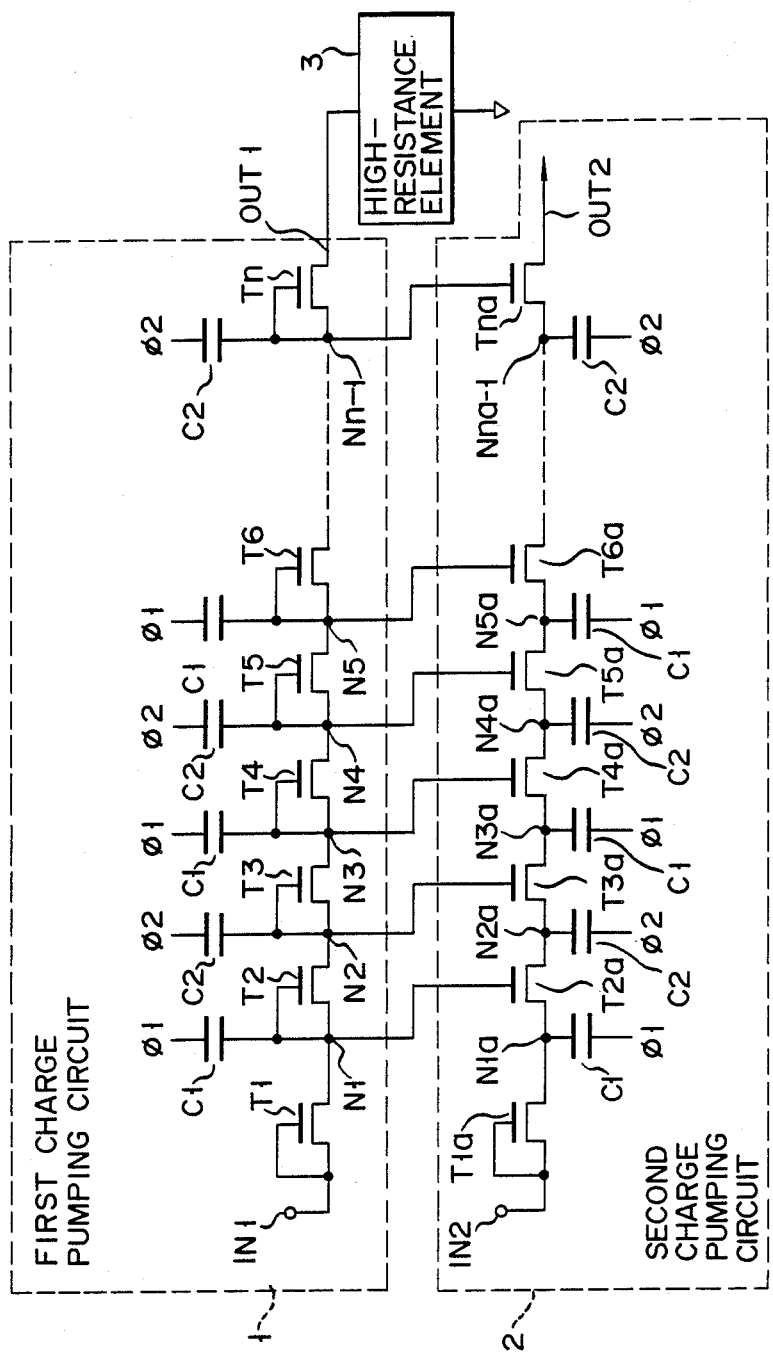
FIG. 4 is a circuit diagram showing an internal booster circuit for an EEPROM according to the present invention.

FIG. 4 shows an internal booster circuit incorporated into a semiconductor circuit, such as an EEPROM. In FIG. 4, 1 and 2 show first and second charge pumping circuits, respectively, with high resistive element 2 connected between a boost-up voltage output node OUT1 of first charge pumping circuit 1 and a ground potential terminal. First charge pumping circuit 1 comprises a plurality of MOS transistors T1 to Tn cascade-connected between input voltage node IN1 and output node OUT1 with their gate connected to a corresponding drain. Of nodes N1 to Nn-1 provided between transistor T1 and transistor Tn, those odd-numbered nodes Ni (i=1, 3, ...) receive a clock signal $\phi 1$ of a first phase via capacitor C1 and those even-numbered nodes Ni (i=2, 4, ...) receive a clock signal $\phi 2$ via capacitor C2. Second charge pumping circuit 2 comprises a plurality of MOS transistors T1a to Tna cascade-connected between input voltage node IN2 and booster voltage output node OUT2 and equal to those of first charge pumping circuit 1. Clock signals $\phi 1$ and $\phi 2$ are alternately applied, respectively via capacitors C1 and C2, to corresponding ones of nodes N1a to Nna-1 provided between transistors T1a and Tna. The gates of transistors T2a ... Tna in second charge pumping circuit 2 are connected to the corresponding gates of transistors T2 ... Tn in first charge pumping circuit 1. The same input voltage (usually a power source voltage $V_{DD}$ externally supplied from EEPROM) is applied to input voltage nodes IN1 and IN2 of charge pumping circuits 1 and 2, respectively. The gates of first stage transistors T1 and T1a are connected to input voltage nodes IN1 and IN2, respectively, and connected substantially in common with each other. The clock signals $\phi 1$ and $\phi 2$ are mutually not so overlapped with respect to each other as in the conventional circuit and have an amplitude level equal to the power source voltage $V_{DD}$.

The first charge pumping circuit 1 performs substantially the same operation as the conventional counterpart, but high resistive element 3 is connected to output node OUT1 and hence almost no outer current loss occurs. As a result, an amount of charge, Q, transferred from one transistor to another adjacent one is very small and a voltage $V_{DD}-V_{TH}-Q/C$ to be boosted at the respective stage node is nearly equal to $V_{DD}-V_{TH}$. Since, therefore, there is almost no external current loss, even if an input voltage $V_{DD}$ is as low as, for example, about 3 V, first charge pumping circuit 1 can obtain an adequate boost-up voltage as shown in FIG. 3.

In second charge pumping circuit 2, the gates of transistors T2a ... Tna are connected to the gates of corresponding stage transistors in the first charge pumping circuit, in place of being connected to the drains of transistors T2a ... Tna in the second charge pumping circuit. As a result, a high gate voltage is applied to the gate of transistors T2a ... Tna as compared to the drain voltage on the side of input voltage node IN2. Since, of a boost-up voltage $V_{DD}-V_{TH}-Q/C$, a voltage portion $V_{TH}$ never occurs, the boost-up voltage at the respective stage becomes $V_{DD}-Q/C$ and it is possible to obtain an adequate boost-up voltage output in the case of an amount of charge, Q, being greater, that is, in the case where there is a greater external current loss.

What is claimed is:

1. A semiconductor integrated circuit device equipped with an internal booster circuit, comprising:
   a first boost-up circuit connected to a first input voltage node to receive a power source voltage;
   a second boost-up circuit including a plurality of second boost-up MOS transistors whose gates receive a voltage boosted up by the first boost-up circuit to compensate for a voltage drop resulting from a respective threshold voltage of the second boost-up MOS transistors; and
   a high resistive element connected between an output node of the first boost-up circuit and a potential terminal, to prevent an external current loss from the first boost-up circuit.

2. The semiconductor integrated circuit device according to claim 1, in which said first boost-up circuit includes a first charge pumping circuit comprising a plurality of first boost-up MOS transistors connected in a cascaded fashion, and first boost-up connection nodes, each first boost-up connection node connected between a corresponding pair of the first boost-up MOS transistors, to serve as a plurality of boost-up stages, and said second boost-up circuit includes a second charge pumping circuit in which said plurality of second boost-up MOS transistors is cascade-connected and equal in number to those of said first charge pumping circuit and the respective gates of said second boost-up MOS transistors receive corresponding boost-up voltages from corresponding first boost-up connection nodes of said first charge pumping circuit.

3. The semiconductor integrated circuit device according to claim 2, in which said first boost-up circuit includes an internal boost-up circuit in which said plurality of first boost-up MOS transistors is cascade-connected between said first input node and said high resistive element with the gate of each first boost-up MOS transistor connected to the drain of the same transistor, in which, of first boost-up connection nodes connected between corresponding pairs of the first boost-up MOS transistors, those odd-numbered nodes receive one of first and second signals of a different phase through a corresponding capacitor and those even-numbered nodes receive the other signal through a corresponding capacitor.

4. The semiconductor integrated circuit device according to claim 2, in which said second boost-up circuit includes said second charge pumping circuit in which said plurality of second boost-up MOS transistors is cascade-connected between a second input voltage node and a second output node and equal in number to those of said first boost-up circuit, in which second boost-up connection nodes are provided, each second boost-up connection node connected between a corresponding pair of the second boost-up MOS transistors, those odd-numbered second boost-up connection nodes receive one of first and second signals of a different phase through a corresponding capacitor and those even-numbered second boost-up connection nodes receive the other signal through a corresponding capacitor, and the respective gate of each of said second boost-up MOS transistors is connected to a corresponding boost-up stage of said first charge pumping circuit.

5. The semiconductor integrated circuit device according to claim 3, in which said second boost-up circuit includes said second charge pumping circuit in which said plurality of second boost-up MOS transistors is cascade-connected between a second input voltage node and a second output node and equal in number to those of said first boost-up circuit, in which second boost-up connection nodes are provided, each second boost-up connection node connected between a corresponding pair of the second boost-up MOS transistors, those odd-numbered second boost-up connection nodes receive one of first and second signals of a different phase through a corresponding capacitor and those even-numbered second boost-up connection nodes receive the other signal through a corresponding capacitor, and the respective gate of each of said second boost-up MOS transistors is connected to a corresponding boost-up stage of said first charge pumping circuit.

* * * * *